R. F. GLOEDE.
JARDINIERE.
APPLICATION FILED FEB. 17, 1915.
1,190,147.
Patented July 4, 1916.
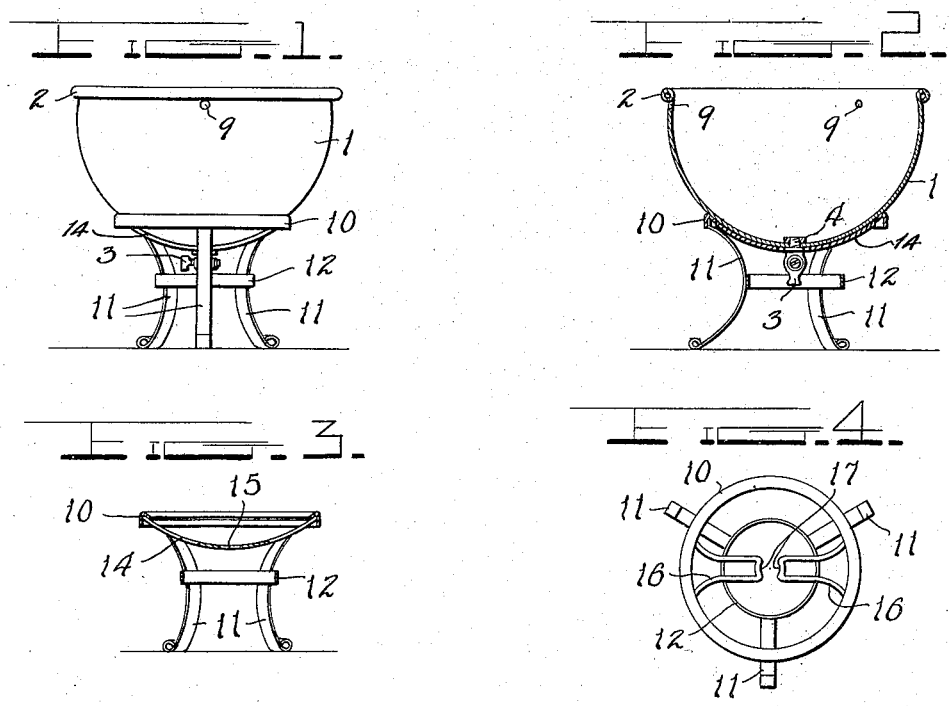
Witnesses
Harry B. Rook.
Harriet B. Cornwall
Inventor
By  RICHARD F. GLOEDE —
N. S. Ilee  Attorney

UNITED STATES PATENT OFFICE.

RICHARD F. GLOEDE, OF EVANSTON, ILLINOIS.

JARDINIÈRE.

1,190,147.	Specification of Letters Patent.	Patented July 4, 1916.

Application filed February 17, 1915. Serial No. 8,735.

*To all whom it may concern:*

Be it known that I, RICHARD F. GLOEDE, a citizen of the United States, residing at Evanston, in the county of Cook and State of Illinois, have invented certain new and useful Improvements in Jardinières, of which the following is a specification.

The present invention relates to certain new and useful improvements in jardinières such as are employed in the cultivation of flowers and plants, and has for its object to provide a device of this character which embodies novel features of construction whereby provision is made for readily drawing off accumulated water from the vessel or receptacle without the necessity of removing the plants and tilting the receptacle, thereby avoiding the possibility of the water standing in the receptacle until it becomes stagnant and is injurious to the plants as well as dangerous to human beings.

Further objects of the invention are to provide a device of this character which is comparatively simple and inexpensive in its construction, which is neat and attractive in its appearance, which eliminates the nuisance of drippings upon porches and in living rooms, and which provides for the easy and quick withdrawal of accumulated water at any time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a similar view showing the device arranged to be used as a jardinière. Fig. 2 is a central vertical sectional view through the device when arranged to be used as a jardinière. Fig. 3 is a vertical sectional view through the stand or pedestal. Fig. 4 is a top plan view of a stand or pedestal, showing a slight modification.

Corresponding and like parts are referred to in the following description and indicated in all the views of the drawings by the same reference characters.

Specifically describing the present embodiment of the invention, the numeral 1 designates the receptacle or shell of the jardinière. This receptacle 1 may be formed of any suitable material, such as thin sheet metal and has a rounded bottom, being preferably substantially semispherical in shape, as shown. A reinforcing rim 2 extends around the upper edge of the receptacle 1, while the bottom of the receptacle is provided with a drain opening which has a pet cock 3 applied thereto. Where the receptacle or shell 1 is formed of thin metal a threaded reinforcing ring 4 may be soldered or otherwise rigidly secured to the bottom of the receptacle 1 in registry with the drain opening so that the threaded stem of the pet cock can be screwed into the ring. Any surplus water will accumulate within the receptacle or shell 1 from which it can be readily drawn through the pet cock 3 into a cup or like member. Owing to the fact that the bottom of the receptacle 1 is curved, all accumulated water within the receptacle will tend to flow through the drain opening when the pet cock is opened and the water can be readily removed without the necessity of lifting the plants from the receptacle and then turning the latter over upon one side. There will be no necessity or excuse for letting the accumulated water stand in the receptacle until it becomes stagnant so as to be injurious to the plants and dangerous to human beings, and neither will the user be subjected to the annoyance of drippings when watering the plants.

As indicated by Figs. 1 and 2, a small stand or pedestal is used in connection with the receptacle 1. This pedestal is shown as including an upper ring 10 of such a size as to conveniently receive the lower end of the semispherical receptacle so as to admit of the latter being held in an upright position. This ring 10 is supported by a series of legs 11 which may be curved inwardly at their middle portions and secured to a reinforcing ring 12 smaller than the upper ring 10 and arranged under the same. The pet cock 3 which is pendent from the center of the receptacle 1 projects downwardly between the legs 11 of the stand or pedestal, and when it is desired to withdraw water from the receptacle a cup or the like can be readily placed under the pet cock 3 without the necessity of removing the receptacle 1 from the pedestal.

The upper ring 10 of the pedestal is provided with a cross bar 14, said cross bar being curved downwardly to accommodate the curved bottom of the receptacle 1, and being provided at its central portion with an opening 15 through which the threaded stem of the pet cock 3 can be inserted preparatory to screwing the pet cock into the ring 4 applied to the drain opening of the receptacle. With this construction the pet cock will provide a means for positively attaching the receptacle 1 to the pedestal, and there will be no danger of the receptacle becoming tilted or misplaced upon the pedestal. Another means for accomplishing this result is illustrated by Fig. 4, in which the supporting ring 10 of the pedestal is provided upon diametrically opposite sides thereof with inwardly projecting wire arms 16 which are curved downwardly and inwardly to accommodate the curved bottom of the receptacle. These arms 16 are designed to have a spring action and may be formed by doubling a piece of wire, the extremities of the wire being soldered or otherwise rigidly secured to the ring 10, while the doubled intermediate portion of the wire providing the extremity of the spring arm is curved inwardly to provide a suitable seat 17 adapted to engage one side of the pet cock 3. These two spring arms will thus co-operate with each other to provide a positive attachment between the pedestal and the receptacle 1. The device admits of accumulated water being readily drawn off without the necessity of lifting the plants out of position, as well as eliminating the nuisance of dripping which is usually occasioned by the watering of plants.

Having thus described the invention, what I claim as new and desire to secure by Letters Patent, is:—

1. A device of the character described, including a substantially semispherical receptacle formed with a curved bottom having a drain opening therein, a pet cock applied to the drain opening and projecting downwardly from the curved bottom of the receptacle, a skeleton pedestal frame engaging the curved bottom of the receptacle to support the same in an elevated and upright position, and means upon the pedestal for engaging the pet cock to lock the receptacle in proper position upon the pedestal.

2. A device of the character described including a receptacle adapted to receive a growing plant or the like, said receptacle being semispherical in shape and formed with a curved bottom having a drain opening therein, a pet cock formed with a stem fitted within the drain opening, a pedestal frame including a ring adapted to fit against the curved bottom of the receptacle to support the receptacle in an upright position, and a transverse bar applied to the ring and provided with an opening adapted to receive the stem of the pet cock for attaching the pedestal frame to the receptacle.

In testimony whereof I affix my signature in presence of two witnesses.

RICHARD F. GLOEDE.

Witnesses:
LEONARD HEDSTRÖM,
GENEVIEVE C. THIEN.

Copies of this patent may be obtained for five cents each, by addressing the "Commissioner of Patents, Washington, D. C."